United States Patent
Haller et al.

(10) Patent No.: US 8,689,457 B2
(45) Date of Patent: Apr. 8, 2014

(54) METHOD AND DEVICE FOR MEASURING THE PROTRUSION OF BEARING SHELLS

(75) Inventors: Andreas Haller, Oestrich-Winkel (DE); Thomas Grooteboer, Essenheim (DE)

(73) Assignee: Federal-Mogul Wiesbaden GmbH, Wiesbaden (DE)

(*) Notice: Subject to any disclaimer, the term of this patent is extended or adjusted under 35 U.S.C. 154(b) by 268 days.

(21) Appl. No.: 13/259,938

(22) PCT Filed: May 18, 2010

(86) PCT No.: PCT/EP2010/056792
§ 371 (c)(1),
(2), (4) Date: Sep. 23, 2011

(87) PCT Pub. No.: WO2010/133579
PCT Pub. Date: Nov. 25, 2010

(65) Prior Publication Data
US 2012/0011734 A1    Jan. 19, 2012

(30) Foreign Application Priority Data
May 19, 2009    (DE) .................... 10 2009 003 231

(51) Int. Cl.
*G01B 1/00*    (2006.01)
(52) U.S. Cl.
USPC ........................ 33/517; 33/DIG. 17
(58) Field of Classification Search
USPC ............................................ 33/517, DIG. 17
See application file for complete search history.

(56) References Cited

U.S. PATENT DOCUMENTS

| | | | | |
|---|---|---|---|---|
| 3,864,835 A * | 2/1975 | Morisaki | | 33/517 |
| 4,610,095 A * | 9/1986 | Tannery | | 33/517 |
| 4,663,857 A * | 5/1987 | Mori | | 33/517 |
| 5,746,002 A * | 5/1998 | Murakami et al. | | 33/517 |
| 8,091,417 B2 * | 1/2012 | Sugimoto | | 73/114.81 |
| 2012/0011734 A1* | 1/2012 | Haller et al. | | 33/517 |

FOREIGN PATENT DOCUMENTS

| | | |
|---|---|---|
| CN | 1472501 A | 2/2004 |
| CN | 2754055 Y | 1/2006 |
| CN | 201093977 Y | 7/2008 |
| DE | 3435245 | 3/1986 |
| DE | 2610598 | 4/1987 |
| DE | 3623362 | 1/1988 |
| GB | 1488786 | 3/1976 |

* cited by examiner

*Primary Examiner* — Yaritza Guadalupe-McCall
(74) *Attorney, Agent, or Firm* — Robert L. Stearns; Dickinson Wright, PLLC

(57) ABSTRACT

The invention relates to a method for determining the protrusion of bearing shells, comprising the following steps: a) clamping a bearing shell at several bearing points; b) applying one or more test forces to at least one point of the bearing shell so that the bearing shell is elastically deformed; c) measuring the deformation of the bearing shell at one or more measuring points of the bearing shell; d) determining the protrusion from the measured deformation. The invention further relates to a device for determining the protrusion of bearing shells, comprising a clamping device, which is suitable for clamping a bearing shell at one or more bearing points, one or more deformation apparatuses, which are suitable for applying one or more test forces to at least one point of the bearing shell, one or more measuring devices, which can measure the deformation of the bearing shell at one or more points when one or more test forces are applied by the deformation apparatus to at least one point of the bearing shell in such a way that the bearing shell is elastically deformed, and an apparatus for determining the protrusion, which can determine the protrusion of the bearing shell from the measured deformation of the bearing shell.

21 Claims, 4 Drawing Sheets

METHOD AND DEVICE FOR MEASURING THE PROTRUSION OF BEARING SHELLS

BACKGROUND OF THE INVENTION

1. Technical Field

The invention relates to a method and a device for measuring the protrusion of bearing shells.

2. Related Art

FIG. 1 shows a bearing shell 1, which is provided with a sliding surface 11, a bearing backing 12 and parting faces 10. In the drawing, a lubricating groove and lubricating apertures are shown in the sliding surface. The bearing shell 1 shown can be used, for example, as a connecting rod bearing.

The bearing shell 1 usually has a spread $d_3$, as shown in FIG. 2, i.e. the diameter of the bearing shell 1 measured across the parting faces is greater than the bearing shell diameter $d_2$ when the bearing shell (1) is fitted into a housing receptacle. This results in a good seating against the housing wall on assembly, so that the bearing shell 1 is prevented from falling out or rotating. The radius of the bearing shell 1 in the installed state, i.e. without the spread, is designated as the Q-value.

The bearing shell 1 also has a so-called "protrusion". In FIG. 3, the protrusion is designated $S_N$. The circumferential length of the bearing shell is greater than the circumferential length of the housing receptacle by the value of the protrusion $S_N$. When the bearing shell 1 is installed, the circumferential length of the bearing is elastically shortened. The crush pressure thereby produced ensures the correct seating of the bearing. In FIG. 3, the bearing shell 1 is pressed into a measuring depression 20. Seen in relation to the measuring depression, the protrusion $S_N$ denotes, as a main feature of the bearing shell 1, the length by which the circumferential length of the bearing shell 1 exceeds that of the measuring depression 20 once the bearing shell 1 has been pressed into the measuring depression 20 with a bearing-specific application force $F_B$. $D_{cb}$ denotes the test seating diameter of the measuring depression. Since, for technical reasons, this main feature cannot be reliably manufactured, it must be tested according to the design specifications. Typical target values for the protrusion are 50 to 150 µm, with a tolerance of 10 to 30 µm.

According to the prior art method shown in FIG. 3, the bearing shell 1 is pressed into the bearing-specific measuring depression 20 by applying a defined inserting force at a defined approach speed. In the process, a form-fit with the solid, stiffly designed depression 20 is pursued. The length of the bearing shell 1 projecting beyond the edge of the measuring depression—the protrusion $S_N$—is measured by contacting or non-contacting means.

The method described requires a high degree of accuracy from the measuring depression and a different measuring depression for each bearing shell type. Furthermore, frictional influences can have a disadvantageous effect on the measurement result and can affect the properties of the bearing shell.

Other methods or proposals from the prior art relate to circumference measurement with the aid of measuring bands stretched over the backing of the bearing or travelling along the backing using a frictional wheel. Possible stretching of the measuring bands or slippage of the frictional wheel can have disadvantageous effects on the measurement result. Wear of the measuring devices also has disadvantageous effects on the measurement result.

The methods described require relatively long cycle times. There is a need for an economical testing procedure which enables a reproducible, comparable and traceable measurement of the protrusion for a tolerance range of 10 to 30 µm, without a bearing-specific measuring depression, with a cycle time of less than 1 s.

DE 34 35 245 A 1 describes a method for determining the load-free protrusion value of a bearing shell. For this purpose, the elastic shortening of the protrusion is measured as a function of a test force applied to a parting face of the bearing shell.

SUMMARY OF THE INVENTION

It is an object of the invention to provide a method and a device for determining the protrusion of bearing shells, which have improved efficiency.

Using the method according to the invention, the protrusion is determined from an elastic deformation of the bearing shell by applying a test force. For this purpose, the bearing shell is clamped at a plurality of bearing points. The clamping can be performed either at discrete points or along bearing sections. In a subsequent step, one or more test forces are applied to at least one point or to at least one region of the bearing shell such that the bearing shell is elastically deformed radially. During or after deformation, the displacement of selected measuring points of the bearing shell in the radial direction is measured. The protrusion can be determined from the deformation of the bearing shell. Since the bearing shell is clamped at discrete points or at particular regions, a measuring depression which essentially covers the whole periphery can be dispensed with. By this means, the above-mentioned disadvantages associated with the use of a measuring depression are overcome. The measurement of the deformation can be carried out by non-contacting means and/or by contacting means. The measurement can also be carried out on the bearing backing (outer surface) and/or on the sliding (inner) surface. A radial shape change in the bearing shell under a pre-determined load is then detected. Dispensing with the measuring depression reduces the costs for measuring equipment. A cycle time for the measurement of less than 0.75 s can be realised and is thus halved relative to the prior art described above. The testing procedure can therefore be used during production immediately following the generation of the protrusion (by means of shaping, with a cycle time of ca. 0.8 s). The forces needed during measurement are smaller by a factor of 2-10 than with the above method using a measuring depression. The testing machine can therefore be designed correspondingly smaller and more economically.

The test forces are preferably applied according to a chronologically-controlled force sequence and/or the chronological sequence of the deformation is measured in order to improve the accuracy of the protrusion determination.

Preferably, the protrusion to be determined is established on the basis of a shape change model. The protrusion can then be determined by comparison with the shape change model or by calculation from the shape change model.

The shape change model can be, for example, a theoretical model with which the protrusion can be calculated using the deformation characteristic. The actual shape-changing behaviour of the bearing shell depends, apart from the material characteristic values, on the topology and other parameters of the sliding bearing and, particularly, on the protrusion. For this reason, the protrusion can be calculated on the basis of the shape-changing behaviour. Apart from an analytical model, the shape change model can be determined empirically based on a series of master shells, or adaptively from comparative measurements of production parts or from a mixture of the different models. A suitable model for determining the protrusion of the bearing shell must be able to describe the protrusion adequately and unambiguously in the parameter ranges occurring in practice, primarily depending on the measurable shape change with given or detected forces (under effectively static or dynamic loading). The analytical model preferably takes account of the influence of the bearing shell shape (diameter, band thickness, width, holes, grooves, cams, spread, oblique position, flaws in backing), the bearing shell material (backing, sliding surfaces) and the prior treatment thereof during production. In the case where empirical data are taken into account, for definitive determination of the protrusion, it may be necessary, as per the underlying model, to determine further parameters of the bearing shell under test that do not concern the shape change alone, by measurements either on individual bearing shells or based on random samples for a batch of bearing shells. Measurement variables of this type can be: spread, oblique position, topography of the parting faces, topography of the backing, surface roughness, modulus of elasticity, hardness, wall thickness, bearing shell width.

Preferably, one or more test forces are applied directly to one or more bearing points or one or more bearing points are displaced. The application of the test forces or control of the path of displacement of bearing points can serve to deform the bearing shell in order to determine the protrusion from the deformation. Alternatively, with displaceable mounting points, a starting configuration can be set for the bearing shell where the test forces will be applied.

Preferably one or more bearing points are displaced in the radial direction in the coordinate system of the bearing shell. In this way, a spread of the bearing shell can preferably be removed before the application of test forces to the bearing shell.

Preferably, the application of the test forces involves the application of a test force to the apex point of the bearing shell, in order to realise a simple and reproducible method.

Preferably, the one or more test forces are applied to the bearing shell over an area so that elastic deformation of the bearing shell is assured.

In a preferred embodiment, the measurement of the shape change of the bearing shell is carried out by non-contacting means at two measuring points on the bearing backing at points which are each spaced from the respective parting face by approximately 30°. Thus, by means of averaging at the two measuring points, an asymmetrical configuration of the bearing shell, for example, due to holes, cams, etc., can be compensated for and the accuracy of the protrusion determination can be improved.

Preferably, in an additional method step to be carried out before the application of the test forces, a reference measurement is performed, which is used for determining a displacement difference for one or more measuring points during deformation. This ensures that the measured deformation relates to the bearing shell to be measured, so that the accuracy of the protrusion determination can be improved.

Preferably, a spread of the bearing shell is cancelled out by lateral constraining forces at the parting faces, so that the accuracy and reproducibility of the protrusion determination can be improved. Preferably, for this purpose, the bearing shell to be measured is clamped at both parting faces.

The above description of the method contains features which can be transferred to the device for carrying out the protrusion determination. In particular, the device suitable for carrying out the above method comprises a clamping device which is suitable for clamping a bearing shell at one or more bearing points or regions, and one or more deforming devices suitable for applying one or more test forces to at least one point or region of the bearing shell, and one or more measuring devices which can measure the radial deformation of the bearing shell at one or more points, regions or sections when one or more test forces are applied by the deforming device to at least one point on the bearing shell so that the bearing shell is elastically deformed radially, and a device for determining the protrusion which can determine the protrusion of the bearing shell from the measured deformation of the bearing shell. The device described here can realise the method described above and the associated advantages thereof.

Preferably, one or more bearing points of the clamping device are displaceable and/or can have test forces applied to them. Due to the almost semicircular cross-section of the bearing shell, the bearing points in question can preferably be displaced in the radial direction in the coordinate system of the bearing shell. Thus, provided two displaceable bearing points clamp the bearing shell at the parting faces, the spread of the bearing shell can be cancelled out.

In order to realise one of the above preferred methods, the deforming device is preferably configured so that a test force can be applied to the apex point of the bearing shell.

It is also preferred that the deforming device has electrical linear units and/or piezoelectric actuators in order to be able to carry out the deformation in a controlled manner and in the elastic region.

For the same reason and in order to load the bearing shell as little as possible, one or more test forces are applied to the bearing shell, preferably over an area.

Preferably, the measuring device has one or more optical sensors in order to be able to measure the deformation of the bearing shell without contact and to load the bearing shell as little as possible during protrusion determination.

In a preferred embodiment, the measuring device has two non-contacting distance sensors, which can detect the shape change in the bearing shells on the bearing backing at points approximately 30° from the respective parting faces when the test forces are applied. Thus, by means of averaging at the two measuring points, an asymmetrical configuration of the bearing shell, for example, due to holes, cams, etc., can be compensated for and the accuracy of the protrusion determination can be improved.

Preferably, the device for determining the protrusion comprises a computer unit, which determines the protrusion using one of the shape change models described above. The arrangement can thus be used for different bearing shell types with little configuration effort.

DETAILED DESCRIPTION OF THE INVENTION

Figure 1:
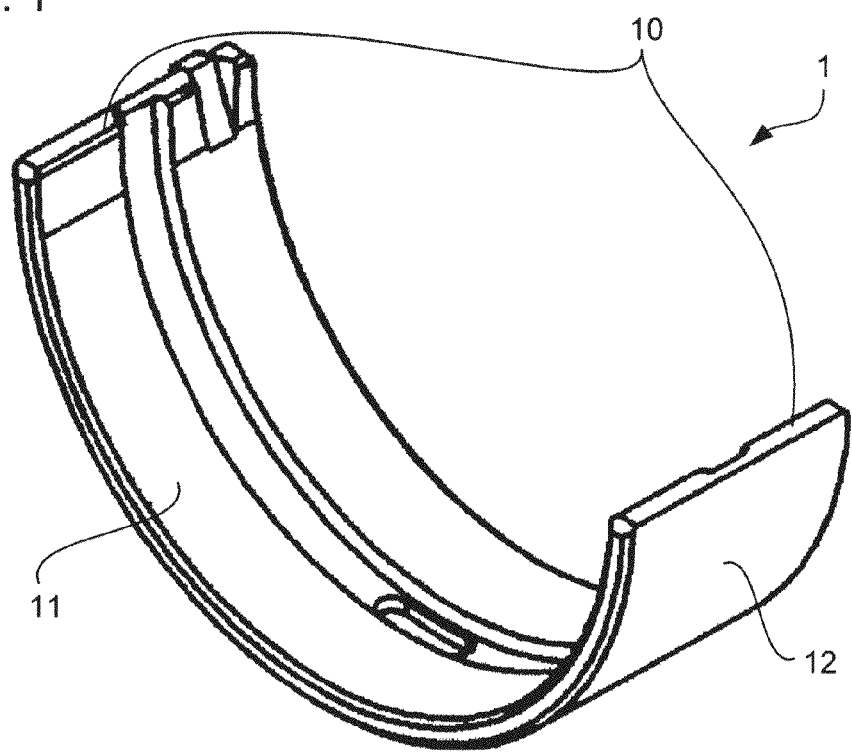
FIG. 1 shows a bearing shell suitable for measurement by the method described, and the device described.
Figure 2:
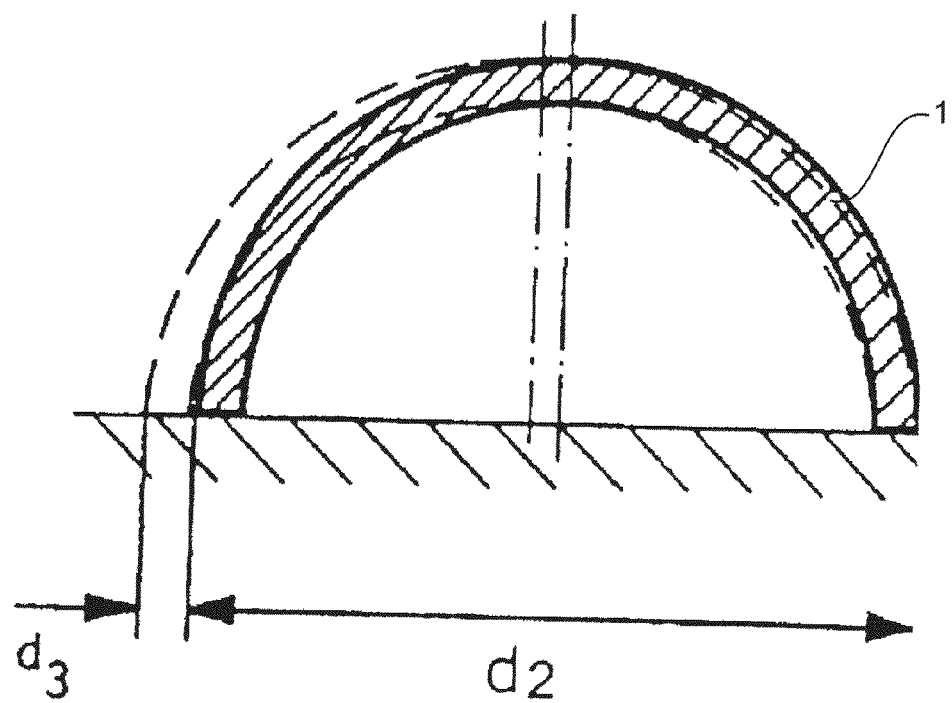
FIG. 2 illustrates the expression "spread" of the bearing shell.
Figure 3:
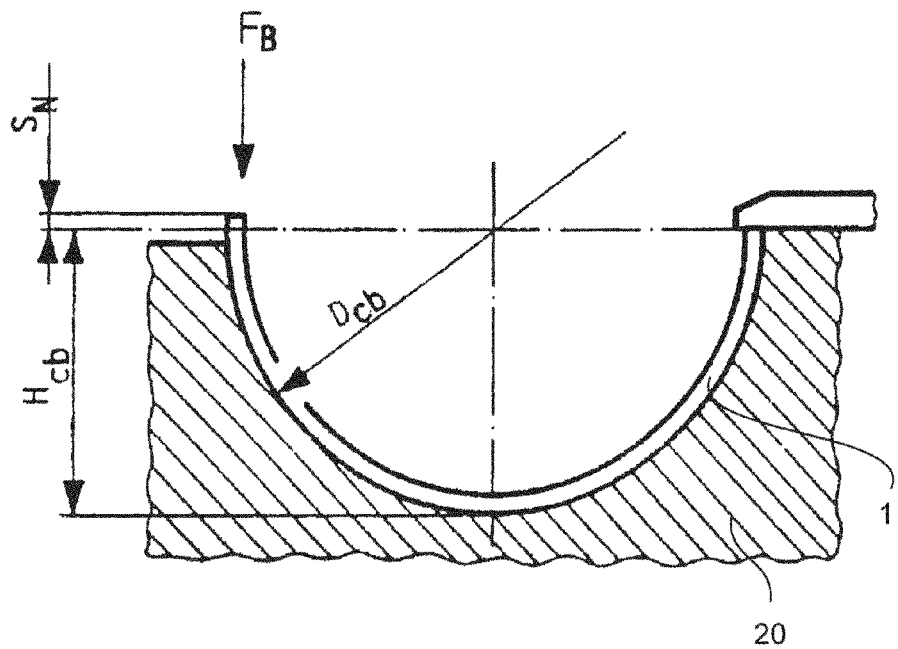
FIG. 3 shows a method for protrusion measurement according to the prior art using a measuring depression.
Figure 4:
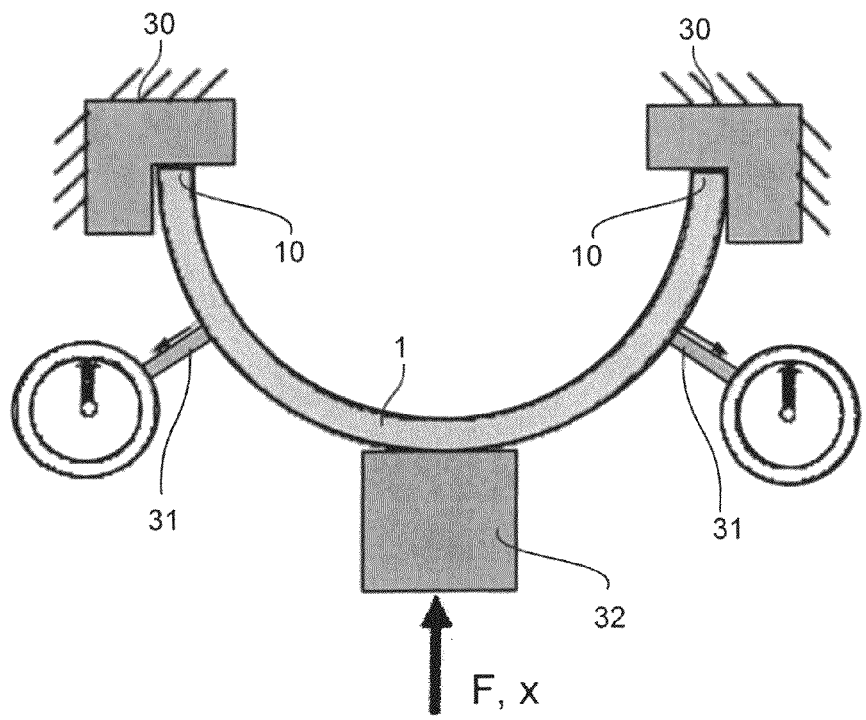
FIG. 4 shows an embodiment of the device for determining the protrusion and makes the method clear.

FIG. 4 shows an embodiment of the measuring device for determining the protrusion. The measuring device comprises a clamping device with two clamping blocks 30. The bearing shell 1 is thus clamped at a plurality of points or sections (designated "bearing points" below). Depending on the configuration of the test device, the individual bearing points can have force applied to them or they can be displaced in a displacement-controlled manner, preferably in the radial direction in the coordinate system of the bearing shell. In the present embodiment, the bearing shell 1 is clamped at both parting faces 10.

Using the displaceable clamping blocks 30, the spread of the bearing shell 1 is preferably cancelled out. Following this, a test force F or a displacement-controlled constraining force x is applied by means of a ram 32 onto the apex point of the bearing shell 1. The force conduction can take place over an area on the bearing backing or on the parting faces via actuating elements (preferably electrical linear units or piezoelectric actuators), so that a plastic deformation on conduction of forces is prevented.

Figure 5:
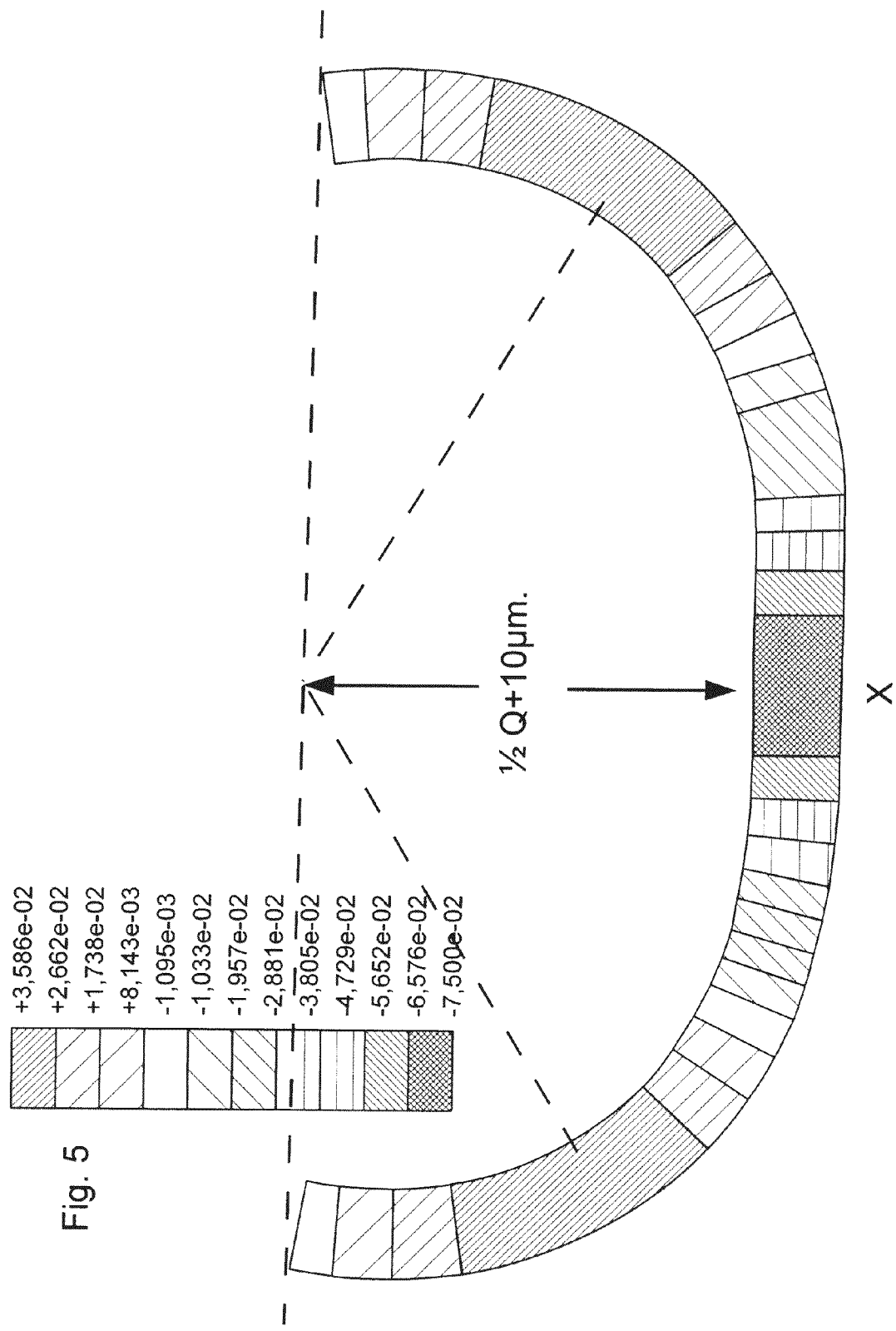
FIG. 5 shows a simulated deformation of a bearing shell using a force applied to the apex point of the bearing shell.

FIG. 5 shows a simulated deformation of the bearing shell 1 under the influence of the force F by means of the ram 32. The deformation is displacement-controlled, the apex point being displaced by 10 μm to ½Q+10 μm. In FIG. 5, the radial deformation of the bearing shell 1 is shown shaded and is exaggerated.

The measuring device carries out absolute distance measurements or measurements of the distance change in defined directions relative to the centre of the bearing shell 1 (preferably in the radial direction relative to the bearing shell) at a plurality of points or sectors of the bearing shell with the aid of sensors 31 during application of the test forces. The sensors 31 can be rigidly connected to the measuring device or can be movably connected to individual bearing points 30. Measuring points can be provided either on the sliding surface (inner diameter) or on the bearing backing (outer diameter) of the bearing shell 1. The sensors 31 used can be contacting or non-contacting distance sensors. For the detection of distances over areas in whole sectors, optical sensors can preferably be used according to the triangulation principle. In the preferred embodiment shown, two non-contacting distance sensors 31 are provided which detect the shape change under load on the bearing backing at points 30° from each parting face 10.

In the simplest case, a reference measurement of the distance to the sensor 31 is carried out after the spread has been cancelled out by lateral constraining forces on the parting faces 10. Thereafter, a vertical force F, x is applied to the apex point, so that the distance of the apex reaches the Q-value with a pre-determined distance addition (displacement-controlled load), and a renewed measurement of the distance to the sensors 31 is carried out. Once again, the distance is determined in the radial direction of the bearing shell at points 30° from the parting face 10. The displacement difference is the radial shape change under vertical (displacement-controlled) load. This difference is the main input variable for automatic computerised determination of the protrusion.

Preferably, the average of both the measuring points (right side and left side) is calculated in order to minimise the asymmetrical deformation due to bearing shells with asymmetrically arranged holes, cams and the like.

The calculation of this and other input variables preferably takes place with the aid of a process computer, in the simplest case by means of a PC.

The measuring device can comprise further sensors which, in separate measurements or during the shape change under load, detect the following variables, possibly only by random sampling: spread, topography of the bearing backing, topography of the parting face, surface roughness, hardness, wall thickness, macroform of the sliding surface.

Information on other input variables (e.g. prior technical treatment) can be transferred from other systems and used as input variables for correction during computation.

One possible realisation of the above described measuring method is simulated with the aid of the finite elements method.

The simulated arrangement comprises a block which serves as a support for the apex of the bearing shell. The bearing shell is held laterally at the parting faces thereof and is loaded on both parting faces with a test force. Similarly, the vertical test force can also be applied by loading via the support block. The simulated sequence provides that initially the actual spread of the bearing shell is cancelled out by horizontally acting forces on the bearing backing close to the parting faces. The parting faces are pressed together to the target dimension for the outer diameter (the Q-value). At this point in time, the apex is relieved of vertical forces. Now the first measurement of the distance of the bearing backing segment close to the sector 30° from the parting face is made. The distance is determined in the radial direction from the axis of the bearing to the sensor (reference measurement before the deformation). Now the support block is displaced in the direction toward the parting faces of the bearing shell until a pre-determined distance from the support plane of the parting faces is reached. This distance is chosen in the simulation as Q-value/2+10 μm. This leads to a radial deflection of the bearing shell shape. Now a second measurement of the radial distance in the sector 30° from the parting face is carried out. The difference between the two measurements gives the maximum shape deviation in the radial direction after cancellation of the spread. Once the spread is known, having been determined in a separate or simultaneous measurement by contacting or non-contacting means, the influence thereof on the difference measurement can be corrected by calculation.

Figure 6:
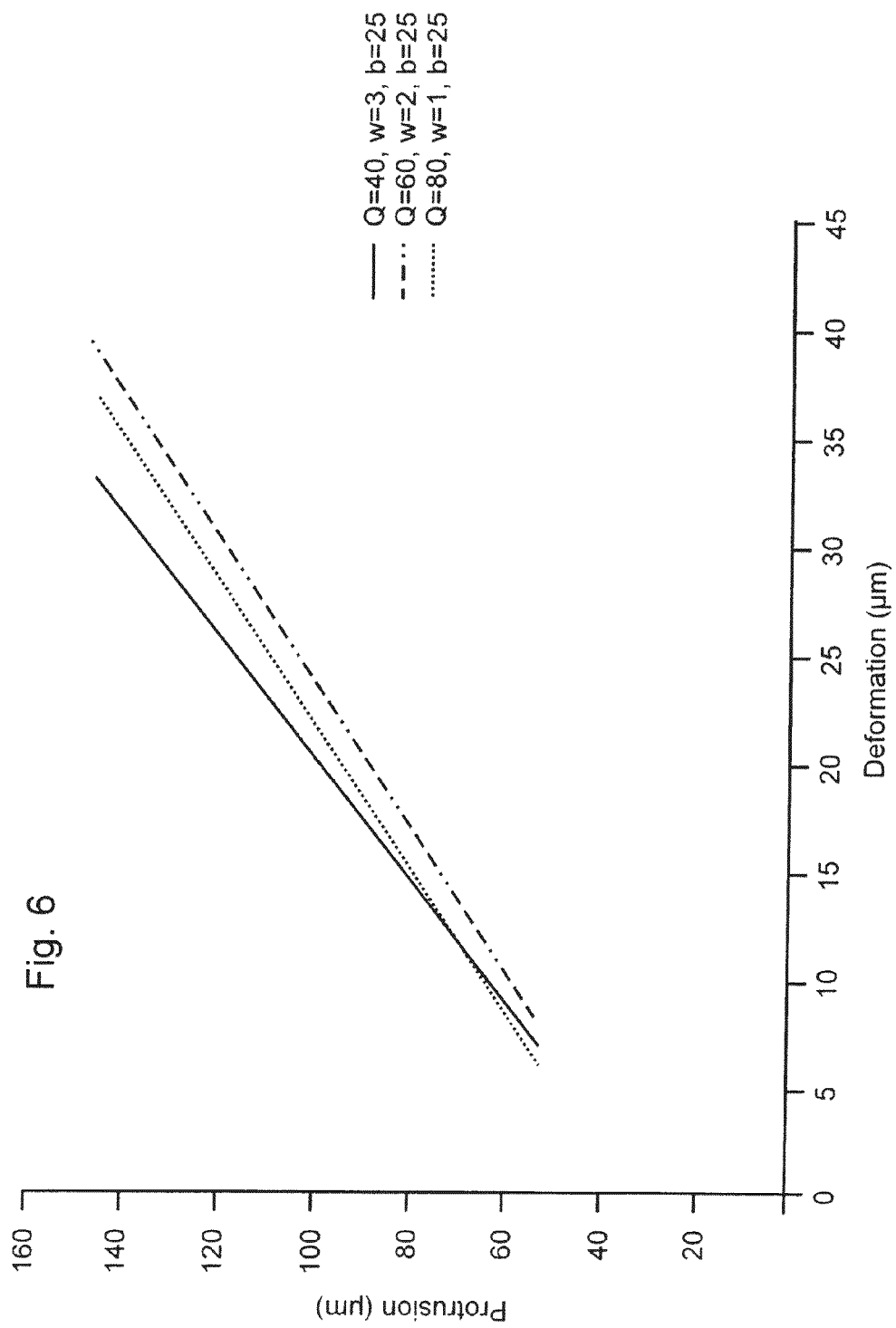
FIG. 6 shows simulation results for the maximum deformation of the bearing shell.

FIG. 6 shows a representation of the displacement-controlled deformation to ½Q+10 μm. It presents simulation results for the maximum deformation of the bearing shell ("Deformation" on the x-axis) under displacement-controlled load with different values for the diameter Q, wall thickness w, and bearing shell width b for a given protrusion ("Protrusion" on the y-axis). As FIG. 6 shows, with no spread present, the difference above is proportional to the protrusion. The difference measurement is slightly dependent on the presence of holes, grooves and cams.

The invention claimed is:

1. A method for determining the protrusion of bearing shells, comprising the following steps:
   a) clamping of the bearing shell at a plurality of bearing points;
   b) applying one or more test forces to at least one point of the bearing shell, so that the bearing shell is elastically deformed radially;
   c) measuring the radial deformation of the bearing shell at one or more measuring points of the bearing shell; and
   d) determining the protrusion from the measured deformation.

2. The method according to claim 1, wherein in step b) test forces are applied according to a chronologically-controlled force sequence and, in step c) the chronological sequence of the deformation is measured.

3. The method according to claim 1 wherein the protrusion to be determined in step d) is determined using a shape change model.

4. The method according to claim 3, wherein the shape change model is determined before step a) from material characteristics and an analytical model, empirically based on a series of master shells, adaptively from comparative measurements of production parts or from a mixture thereof.

5. The method according to claim 1, wherein one or more bearing points are moved in a displacement-controlled manner before step c).

6. The method according to claim 5, wherein the one or more bearing points are displaced in the radial direction in the coordinate system of the bearing shell.

7. The method according to claim 1, wherein at least one of the test forces in step b), is applied to the apex point of the bearing shell.

8. The method according to claim 1, wherein the one or more test forces are applied to the bearing shell over an area.

9. The method according to claim 1, wherein the bearing shell comprises two parting faces and a bearing backing, and the measurement of the radial deformation of the bearing shell in step c) is carried out in a contact-free manner at two measuring points on the backing of the bearing shell at points approximately 30° from the respective parting face.

10. The method according to claim 1, wherein before step b), a reference measurement is performed, which is used for determining a displacement difference for one or more measuring points during deformation.

11. The method according to claim 1, wherein before step c) a spread of the bearing shell is cancelled out by lateral constraining forces at two parting faces of the bearing shell.

12. A device for measuring the protrusion of bearing shells, comprising:
  a clamping device which is suitable for clamping a bearing shell at one or more bearing points,
  one or more deforming devices suitable for applying one or more test forces to at least one point on the bearing shell,
  one or more measuring devices, which can measure the radial deformation of the bearing shell at one or more points when one or more test forces are applied by the deforming device to at least one point on the bearing shell so that the bearing shell is elastically deformed radially, and
  a device for determining the protrusion, which can determine the protrusion of the bearing shell from the measured deformation of the bearing shell.

13. The device according to claim 12, wherein the one or more bearing points of the clamping device can have the test forces applied to them by means of the deforming device or can be displacement-controlled.

14. The device according to claim 13, wherein there are a plurality of the bearing points and they are displaceable in the radial direction in the coordinate system of the bearing shell.

15. The device according to claim 12, wherein the one or more test forces are applied by means of the deforming device to the apex point of the bearing shell.

16. The device according to claim 12, wherein the deforming device has electrical linear units and/or piezoelectric actuators.

17. The device according to claim 12, wherein the one or more test forces are applied to the bearing shell over an area.

18. The device according to claim 12, wherein the measuring device has one or more optical sensors.

19. The device according to claim 12, wherein the bearing shell comprises two parting faces and one bearing backing, and the measuring device comprises two contact-free distance sensors which are able to detect the radial deformation of the bearing shell on the bearing backing at points approximately 30° from the respective parting face when the test forces are applied.

20. The device according to claim 12, wherein the device for determining the protrusion comprises a computer unit which determines the protrusion using a shape change model.

21. The device according to claim 20, wherein the shape change model is a model consisting of material characteristic values and an analytical model, a model empirically determined from a series of master shells, a model determined adaptively from comparative measurements with production parts or a mixed form thereof.

* * * * *